Dec. 3, 1940.  E. C. HORTON  2,223,661
MOTOR VEHICLE ACCESSORY SYSTEM
Filed April 1, 1939
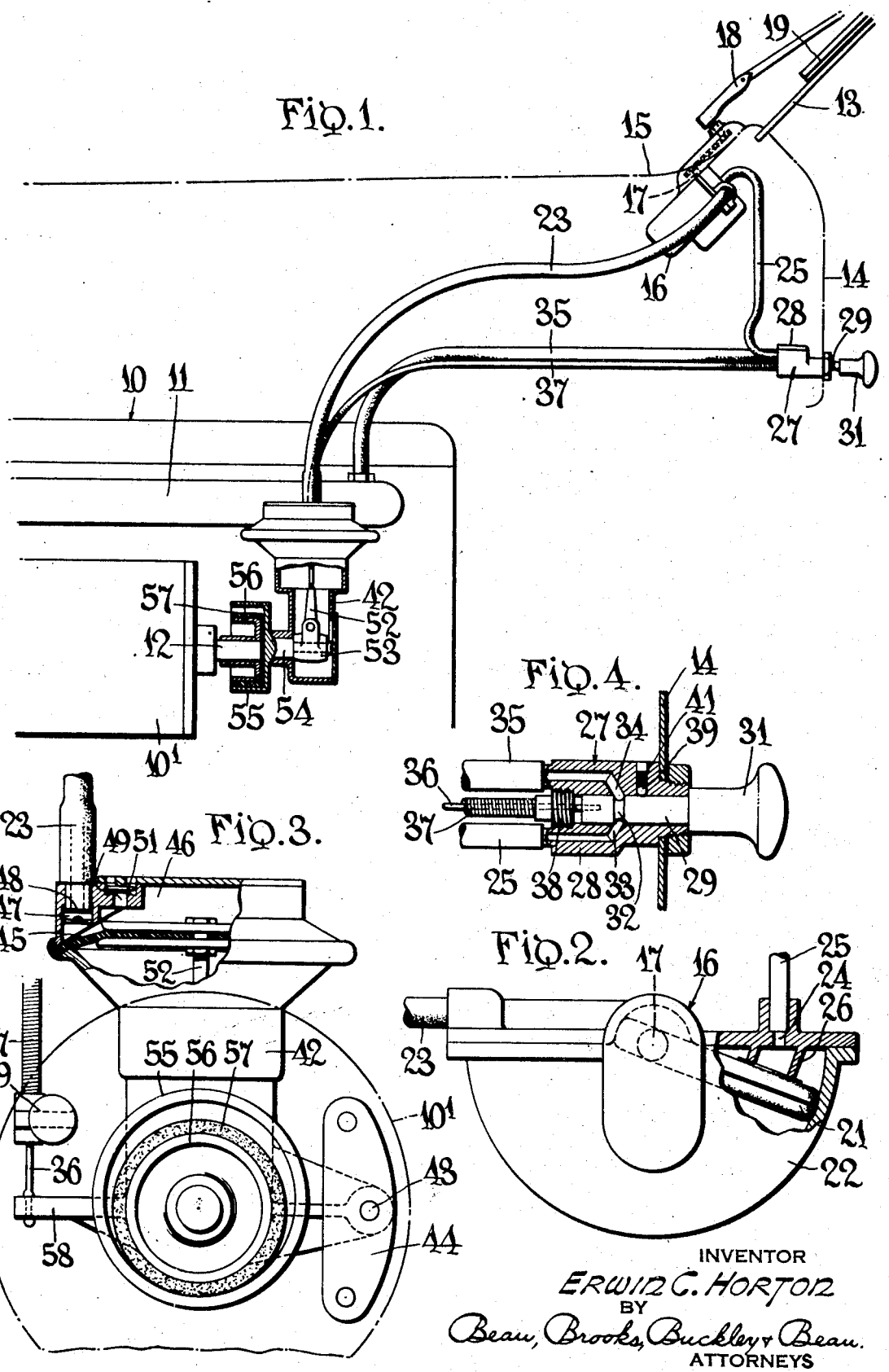
INVENTOR
ERWIN C. HORTON
BY
Beau, Brooks, Buckley & Beau.
ATTORNEYS Patented Dec. 3, 1940

2,223,661

UNITED STATES PATENT OFFICE 2,223,661

MOTOR VEHICLE ACCESSORY SYSTEM

Erwin C. Horton, Hamburg, N. Y., assignor to Trico Products Corporation, Buffalo, N. Y.

Application April 1, 1939, Serial No. 265,613

11 Claims. (Cl. 60—6)

The present invention relates to a windshield cleaner adapted for any window or windshield surface of a vehicle and having a parking device, and it relates particularly to improved instrumentalities for operating and controlling the operation of the cleaner and parking device.

According to the invention the windshield cleaner may have a driven member, such as a wiper shaft, operated by power taken from a drive member such as an engine driven generator shaft, and parked or moved to a predetermined rest position by instrumentalities other than energy obtained from the drive member, such as means operated by fluid pressure maintaining at an engine manifold, control means being employed to enable the operator to effect either operation of the cleaner or operation of the parking means. The windshield cleaner driven member, or wiper shaft, may be operated by fluid pressure in the conventional manner, the pressure being obtained from a pump driven by the drive member, or generator shaft, and the control means may serve to cause engagement or disengagement of a clutch interposed between the drive member and the pump, the control means serving to render the parking means ineffectual when the clutch is engaged to cause operation of the pump and cleaner, and serving to render the parking means operative when the clutch is disengaged.

These and other objects and advantages will appear from the following description of the embodiment of the invention shown in the accompanying drawing, wherein:

Fig. 1 is a side elevation of the windshield cleaner and its operating and control mechanisms applied to a motor vehicle, parts of the pump appearing in section;

Fig. 2 is a rear elevation, partly in section, of the windshield cleaner;

Fig. 3 is a front elevation, also partly in section, of the pump and clutch; and Fig. 4 is a longitudinal section through the control unit.

The motor vehicle shown in Fig. 1 has an engine 10 with intake manifold 11, or other source of fluid pressure different from atmospheric pressure, a drive member, such as the engine driven generator shaft 12, and a windshield 13 beneath which is an instrument or control panel 14. Mounted within a cowl 15 forward of the windshield is a windshield cleaner 16 having a driven shaft 17 which may either directly or through suitable gearing or linkage operate a windshield wiper shown in Fig. 1 as comprising a wiper arm 18 and windshield wiper blade 19.

The driven shaft 17 may be operated to effect the wiping action of the blade by a vane 21 affixed thereto and moved back and forth in the cleaner casing 22 under the influence of fluid pressures of different degrees upon the opposite faces thereof, induced by the withdrawal of air from the cleaner through a conduit 23 and automatically directed or controlled by suitable valve mechanism, not shown in the drawing, but all as is well known and understood in this art.

The parking means, which serve to hold the shaft 17 in a predetermined position when the cleaner is not in operation, comprise a port 24, opening into the casing 22 on one side of the vane 21 through which air may be withdrawn through a conduit 25 to hold the vane 21 against a suitable stop 26 which may comprise an annular seat for the vane in the position shown in Fig. 2. In this position of the vane 21 and shaft 17 the wiper arm 18 and blade 19 may be at a terminal position of the operating stroke or slightly therebeyond.

The conduit 25 extends to the control unit 27 shown in detail in Fig. 4 which may include a casing 28 suitably mounted upon panel 14, the casing having a bore slidingly receiving a stem 29 carrying a control knob 31. An annular groove 32 is provided on the stem for connecting opposed ports 33 and 34 that are formed in the casing, port 33 opening into conduit 25 and port 34 opening into a conduit 35 which extends to intake manifold 11 or other suitable source of fluid pressure.

The end of stem 29 opposite knob 31 is joined to a wire 36 extending through a guiding tube 37 to the clutch and pump unit for a purpose to be hereinafter fully described. Preferably the tube 37 is anchored, as for example by a threaded plug 38, to the casing 28.

When the knob 31 is retracted (moved to the right in Figs. 1 and 4) the stem 29 is shifted, drawing the wire 36 within the tube 37 and moving the groove 32 in the stem out of register with ports 33 and 34 thereby blocking fluid communication between conduits 25 and 35. Outward movement of the stem may be determined by a ball latch 39 pressed by a spring 41, the ball being movable radially of the axis of stem 29 in a recess in casing 28, and being spring pressed into groove 32 to releasably retain the stem in retracted position.

The pump and clutch unit shown in Figs. 1 and 3 includes a housing 42 pivoted at 43 to a support 44 that may be secured to the generator 10'. Extending across the housing is a diaphragm piston 45 above which is a pump chamber 46. Into the latter opens a port 47 communicating with conduit 23 and closed by a check valve 48 that opens upon fluid flow from port 47 into pump chamber 46. Also opening into the pump chamber is an atmospheric port 49 closed by a check valve 51 that opens upon fluid flow from chamber 46 into the atmosphere.

The central part of diaphragm 45 is secured to a connecting rod 52 which has a bearing 53 upon the crank pin of a crank shaft 54 which is journalled for rotation in casing 42. Carried by the crank is the outer member 55 of a clutch, the inner member 56 of the latter being secured to the drive shaft 12. The inner member 56 of the clutch may be provided around its periphery with suitable clutch facing material 57.

Extending from the housing 42 is an arm 58 connected to the control wire 36. Tube 37 which surrounds the wire is preferably anchored adjacent the arm 58 to a support 59 which may be extended from the generator 10', the engine or other convenient part of the vehicle.

When during operation of the engine and rotation of drive shaft 12, the control knob 31 is in the idle position shown in Fig. 4, the parking means will operate to hold vane 21 and shaft 17 in the position shown in Fig. 2 by reason of withdrawal of air through port 24 via conduit 25, port 33, annular groove 32, port 34, and conduit 35 into the intake manifold 11 where a less-than-atmospheric pressure exists.

At the same time the wire 36 supports the arm 58 of pump housing 42 in a position slightly lower than that shown in Fig. 3 so that clutch members 55 and 56 are disengaged, the surfacing material 57 being entirely out of contact with the inner periphery of outer clutch member 55. Accordingly, the pump will not operate at this time.

If the control handle 31 be retracted (drawn to the right in Fig. 4) until groove 32 is engaged by ball latch 29, the resulting movement of wire 36 will lift arm 58 partially rotating casing 42 about pivot 43 (clockwise) to the position shown in Figs. 1 and 3 wherein the clutch members 55 and 56 are engaged.

The pump will now operate, rotation of drive shaft 12 being imparted to crank shaft 54 causing reciprocating flexure of diaphragm 45 to alternately expand and contract pump chamber 46. Upon each contraction air will be expelled from the chamber to the atmosphere past valve 51, and upon each expansion air will be drawn from conduit 23 into the chamber past valve 48.

The resultant operation of the windshield cleaner will not be prevented or impeded by the parking means since now the source of suction is disconnected from the parking port by the positioning of annular groove 32 of the stem 29 out of register with ports 33 and 34.

It will be understood that the apparatus herein described and illustrated is for the purpose of illustrating the inventive principles involved, these principles being susceptible of other physical embodiment without departing from the invention or the scope of the appended claims.

I claim:

1. In combination with a vehicle having a power drive shaft and a source of suction, a windshield cleaner operable by suction and having a parking device operable by suction, a suction pump, clutch means for connecting the pump to the shaft for operation thereby, a first conduit for connecting the cleaner to the pump for operation thereby, a second conduit for connecting the parking device to said source of suction, a control device movable to one position to simultaneously effect engagement of the clutch and close said second conduit, or to another position to simultaneously effect disengagement of the clutch and open said second conduit, and means to releasably retain the control device in said one position.

2. In combination with a vehicle having a drive member and a source of fluid pressure, a windshield cleaner operable by fluid pressure and having parking means operable by fluid pressure, a pump for supplying fluid pressure to operate the cleaner and a clutch connecting the pump to the drive member for operation thereby, an operating connection between the parking means and said source for operation thereby, a control member movable to operating and non-operating positions, means operating upon movement of the control member to operating position to engage said clutch and interrupt the connection between the parking means and said source, and operating upon movement of the control member to non-operating position to disengage said clutch and establish the connection between the parking means and said source.

3. In combination with a vehicle having a drive member and a source of suction, a windshield cleaner operable by suction and having parking means operable by suction, a suction pump and a clutch for connecting the pump to said drive member for operation thereby, a conduit connecting the cleaner to said pump for operation thereby, and means for disengaging said clutch and connecting the parking means to the source of suction, or for engaging said clutch and disconnecting the parking means from the source of suction.

4. In combination with a vehicle having a power drive member and a source of fluid pressure, a windshield cleaner having a driven member, means including a clutch for actuating the driven member by said drive member, means operable by fluid pressure from said source for parking the driven member, and means for connecting the source to the parking means and for disengaging said clutch, or for disconnecting the source from the parking means and engaging said clutch.

5. In combination with a vehicle having a drive member and another source of energy, a windshield cleaner having a driven member, means including a clutch for actuating the driven member by said drive member, a second means operable from said source for parking the driven member, and means for effecting operation of the second means and for disengaging said clutch, or for discontinuing operation of the second means and engaging said clutch.

6. In combination with a vehicle having a drive member and a source of fluid pressure, a windshield cleaner operable by fluid pressure and having parking means operable by fluid pressure, a pump and a clutch connecting the pump to said drive member for operation thereby, means connecting the cleaner to said pump for operation thereby, means for disengaging said clutch and connecting the parking means to said source, or for engaging said clutch and disconnecting the parking means from the source.

7. In combination with a vehicle having a drive member and another source of energy, a windshield cleaner operable by fluid pressure and having parking means operable by said source of energy, a pump providing fluid pressure for operating the cleaner, means for rendering said pump inoperative and operatively connecting the parking means to said source, or for rendering said pump operative and disconnecting the parking means from said source.

8. In combination with a vehicle having a drive member and another source of energy, a windshield cleaner having a driven member operable by fluid pressure and parking means operable by said source of energy to park said driven member, a pump and a clutch connecting the pump to said drive member for operation thereby, means connecting the cleaner to the pump to cause operation of the driven member, and means for disengaging said clutch and connecting the parking means to said source for operation thereby, or for engaging the clutch and disconnecting the parking means from said source.

9. In combination with a vehicle having a drive member and a source of fluid pressure, a windshield cleaner operable by fluid pressure, a pump connected to the cleaner independently from said source for providing fluid pressure for operating the cleaner, said windshield cleaner having parking means connected to said source independently from said pump, means for discontinuing operation of the windshield cleaner by said pump and operatively connecting the parking means to said source, or for effecting an operative relationship between the pump and cleaner and disconnecting the parking means from said source.

10. In combination with a vehicle having a drive member and another source of energy, a windshield cleaner having a driven member, means including a clutch for actuating the driven member by said drive member, a second means operable from said source for parking the driven member, and control means including means to engage or disengage said clutch and means to discontinue or continue operation of the second means.

11. In combination with a vehicle having a drive member, a windshield cleaner and pump means actuated by the drive member for operating the cleaner, said cleaner having parking means operable by energy from another source, and common control means for disrupting operation of the cleaner by the drive member and pump means and simultaneously operating the parking means, or for rendering the latter inoperative and simultaneously effecting operation of the cleaner by the drive member.

ERWIN C. HORTON.